United States Patent
Breeding

(10) Patent No.: US 6,533,499 B2
(45) Date of Patent: Mar. 18, 2003

(54) SOIL AND GROUNDWATER REMEDIATION SYSTEM

(76) Inventor: Boyd Breeding, 1863 S. 2500 East, Salt Lake City, UT (US) 84108

( * ) Notice: Subject to any disclaimer, the term of this patent is extended or adjusted under 35 U.S.C. 154(b) by 0 days.

(21) Appl. No.: 09/805,519

(22) Filed: Mar. 13, 2001

(65) Prior Publication Data

US 2002/0141827 A1 Oct. 3, 2002

(51) Int. Cl.7 .................................................. B09B 3/00
(52) U.S. Cl. ........................... 405/128.75; 405/128.25; 405/128.45; 405/128.5; 405/128.7; 210/170; 210/747; 210/167
(58) Field of Search ................................. 210/170, 747, 210/167; 405/128.25, 128.45, 128.5, 128.7, 128.75

(56) References Cited

U.S. PATENT DOCUMENTS

| | | | |
|---|---|---|---|
| 3,655,343 A | * | 4/1972 | Galeano ...................... 162/31 |
| 5,180,503 A | | 1/1993 | Gorelick et al. |
| 5,286,141 A | | 2/1994 | Vigneri |
| 5,318,698 A | | 6/1994 | Bernhardt |
| 5,380,126 A | | 1/1995 | Bernhardt |
| 5,389,267 A | | 2/1995 | Gorelick et al. |
| 5,425,598 A | | 6/1995 | Pennington |
| 5,525,008 A | | 6/1996 | Wilson |
| 5,577,558 A | * | 11/1996 | Abdul et al. ................. 166/106 |
| 5,611,642 A | | 3/1997 | Wilson |
| 5,616,304 A | * | 4/1997 | Stormo ........................ 266/235 |
| 5,620,593 A | | 4/1997 | Stagner |
| 5,746,926 A | * | 5/1998 | Ross et al. ................... 210/761 |
| 5,803,174 A | | 9/1998 | Gilmore et al. |
| 5,855,775 A | | 1/1999 | Kerfoot |
| 5,879,108 A | | 3/1999 | Haddad |
| 5,967,230 A | | 10/1999 | Cooper et al. |
| 5,985,149 A | * | 11/1999 | Raetz et al. ................. 210/617 |
| 5,997,751 A | * | 12/1999 | Higo et al. .................. 210/758 |
| 6,007,274 A | | 12/1999 | Suthersan |
| 6,083,407 A | * | 7/2000 | Kerfoot ....................... 210/170 |
| 6,158,924 A | * | 12/2000 | Athens et al. ............... 166/268 |

* cited by examiner

Primary Examiner—Heather Shackelford
Assistant Examiner—Katherine Mitchell
(74) Attorney, Agent, or Firm—Jones, Waldo, Holbrook & McDonough; Michael W. Starkweather; Brent T. Winder

(57) ABSTRACT

A liquid remediation system is disclosed comprising a reaction chamber having an inlet in communication with a source of liquid. A pump directs the liquid through the reaction chamber. A reactive medium, that chemically reacts with a contaminant is dispersed throughout the reaction chamber. At least one discharge loop may direct the liquid back to the source from the reaction chamber after the liquid has undergone a level of remediation. Also disclosed is a method of remediating a liquid. In the method a reaction chamber is provided, having an inlet in communication with a source of liquid. The liquid is directed through the reaction chamber by a pump. A contaminant in the liquid is chemically reacted with a reactive medium that is dispersed throughout the reaction chamber. The liquid is then directed back to the source from the reaction chamber through at least one discharge loop after the liquid has undergone a level of remediation.

21 Claims, 5 Drawing Sheets

SOIL AND GROUNDWATER REMEDIATION SYSTEM

THE FIELD OF THE INVENTION

The present invention relates generally to a method and system for remediating contaminated soil and groundwater, and more particularly to a method and system for exposing contaminated groundwater to a re active medium suspended as a slurry throughout a reaction chamber.

BACKGROUND OF THE INVENTION

There exists a variety of systems and methods employed for remediation of contaminated soil and groundwater. The following patents disclose some specific examples of soil and groundwater remediation systems that are known in the prior art. Each of these U.S. Patents is herein incorporated by reference for its supporting teachings.

U.S. Pat. No. 6,007,274 to Suthersan discloses a method and system for removing contaminants from the phreatic zone, also known as the saturation zone, or groundwater. The technique involves gas sparging and oxidation while increasing the surface area for mass transfer by the placing of packing balls into the eductor tube. The system is comprised of a means for supplying gas/ozone mixture to the lower extent of a well which induces a flow of groundwater and gas bubbles up the well. The system contains a conduit within the well, which extends below the water table. The conduit has a lower fluid-permeable section which is located below the water table and an upper fluid-permeable section which is adjacent the water table.

U.S. Pat. No. 5,967,230 to Cooper et al. discloses a remediation treatment that creates environmentally neutral species from hydrocarbon contaminants. A catalyst is injected into the site and is permitted to diffuse through the site. An oxidizing agent is then introduced into the site to release a free radical in a Fenton-type reaction. The compounds react to release a free radical, which acts upon the contaminants to form environmentally neutral species. Diffusion of both compounds is aided by turbulence induced in the groundwater. Reaction vapors are collected above ground, filtered, and vented to the atmosphere.

U.S. Pat. No. 5,879,108 to Haddad discloses an in situ air sparging/soil vapor extraction apparatus that includes first, second and third concentrically arranged pipes disposed in a single bore hole.

U.S. Pat. No. 5,855,775 to Kerfoot discloses an apparatus for active in situ multi-element gas sparging for bioremediation or physico-chemical degradation for removal of contaminants in a soil formation containing a subsurface groundwater aquifer or a substantially wet unsaturated zone.

U.S. Pat. No. 5,803,174 to Gilmore, et al. discloses a method and apparatus for the remediation of contaminated soil and groundwater wherein a reactive pack material is added to the annular fill material utilized in standard well construction techniques.

U.S. Pat. No. 5,620,593 to Stagner discloses an in-well system for simultaneously treating and extracting groundwater by injecting compressed gas through the groundwater in multiple successive stages as it is pumped out of a well. The process is usable for in-well aeration stripping of Volatile Organic Compounds from groundwater or for other applications in which it is desirable to pass compressed gas through groundwater to alter the physical, chemical, or radiological properties of the groundwater prior to its discharge from the well.

U.S. Pat. Nos. 5,611,642 and 5,525,008 to Wilson disclose a method and apparatus for in-situ treatment of soil and groundwater contaminated with organic pollutants. The process involves defining the nature and extent of the contamination; determining the hydrology and geology of the contaminated area; determining the volume and concentration of a reactive solution required to effect treatment of the contaminated area; injecting the reactive solution into one or more injectors that are inserted into the ground, sealed and positioned so as to assure flow of the reactive solution through the contaminated area; allowing the reactive solution to flow through the contaminated area thereby reacting chemically with the contaminants contained within the contaminated area; and determining when the treatment is complete by monitoring by-products of the chemical reaction. Preferably, the reactive solution is an aqueous solution of hydrogen peroxide and metallic salts.

U.S. Pat. No. 5,380,126 to Bernhardt discloses a device for rinsing contaminants from ground wherein groundwater is received in a well shaft through lower perforations, pumped up the well shaft, and out to upper ground regions through upper perforations, so that it can circulate back down to the groundwater level, thus flushing contaminants from the upper ground regions. A filter or cleaning device may be placed in the circulation path to remove contaminants.

U.S. Pat. No. 5,318,698 to Bernhardt discloses an arrangement for cleaning contaminated groundwater and a ground region through which it flows comprising a shaft extending to a region of groundwater to be cleaned, the shaft having a shaft wall with two water permeable wall regions located above and below a groundwater level so that a separating region is formed in the shaft between the water permeable regions under the groundwater level, a through going passage extending through the separating region and ending above the groundwater level in the shaft, a filter arranged in the shaft, and a circulating pump arranged in the shaft so that the through going passage forms a part of a flow path.

U.S. Pat. No. 5,286,141 to Vigneri discloses a method for remediating a hydrocarbon-contaminated region of a subterranean body of groundwater to destroy or reduce the initial concentration levels of hydrocarbon contaminants.

U.S. Pat. No. 5,180,503 to Gorelick, et al. discloses an in-situ system for removing volatile organic compounds (VOCs) from groundwater. The technique includes gas-lift pumping and in-situ vapor stripping.

As the foregoing references indicate, a common practice in soil and groundwater remediation is to introduce a reactive component into a contaminated area. The reactive component will then either physically remove the contaminant (e.g. it will be carried out in bubbles), or chemically react with the contaminant. In either case, the net result is the removal of the contaminants from the area.

A key consideration in groundwater remediation systems is the amount of time the system must operate in order to complete remediation. The longer a remediation system needs to operate, the greater the expense. Two key factors in determining operation time are 1) the effectiveness of the reactive component, and 2) the exposure the groundwater has to the reactive component. Therefore, a need exists for a groundwater remediation system that utilizes a more effective reactive component, and that can better expose the groundwater to the reactive components, thus requiring less operation time, and hence less expense.

SUMMARY OF THE INVENTION

It is therefore a feature of the present invention to provide a soil and groundwater remediation system and method that more effectively forces contact between contaminants in groundwater and a reactive medium. The method allows for improved reaction rates by suspending reactive particles within the fluid being treated. Improved reaction rates allow for less operation time, and hence less expense.

The present invention relates generally to a method and system for remediating contaminated soil and groundwater, and more particularly to a method and system for exposing contaminated groundwater to a reactive medium suspended as a slurry throughout a reaction chamber.

Specifically, the present invention is a liquid remediation system. The system includes a reaction chamber that has an inlet in communication with a source of liquid. A pump directs the liquid through the reaction chamber. A reactive medium that is dispersed throughout the reaction chamber chemically reacts with a contaminant. The liquid is directed back to the source from the reaction chamber, through at least one discharge loop, after the liquid has undergone a level of remediation.

The reaction chamber may optionally include an upper reaction chamber portion and a lower reaction chamber portion. The upper reaction chamber may form a horizontal extension that is substantially perpendicular to the lower reaction chamber, and may further include a vertical portion that is perpendicular to the horizontal extension. The vertical portion is in communication with the horizontal extension at an end of the horizontal extension opposite the lower reaction chamber opening.

In one embodiment, the upper reaction chamber comprises a chamber extension, a conduit in communication with the lower reaction chamber and extending into the chamber extension, and a plurality of openings in a bottom side of the conduit for initially directing the liquid in a downward direction inside the chamber extension.

Other optional features of the present invention include at least one recirculation pipe having one end in communication with the reaction chamber, and another end proximate to the inlet. It is also noted that the pump may include a discharge portion that is equipped with a slurry suspending nozzle.

Also disclosed in the present invention is a method of remediating a liquid. A reaction chamber is provided that includes an inlet that is in communication with a source of liquid. The liquid is directed through the reaction chamber by a pump. A reactive medium, that is dispersed throughout the reaction chamber, is chemically reacted with a contaminant in the liquid. Once the liquid has undergone a level of remediation, it is directed back to the source from the reaction chamber through at least one discharge loop.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

It is noted that the drawings of the invention are not to scale. The drawings are merely schematic representations, not intended to portray specific parameters of the invention. The drawings are intended to depict only selected embodiments of the invention, and therefore should not be considered to be limiting the scope of the invention. The invention will be described with additional specificity and detail through the use of the accompanying drawings. Like numbering between figures represent like elements.

DETAILED DESCRIPTION OF THE PREFERRED EMBODIMENT(S)

Figure 1:
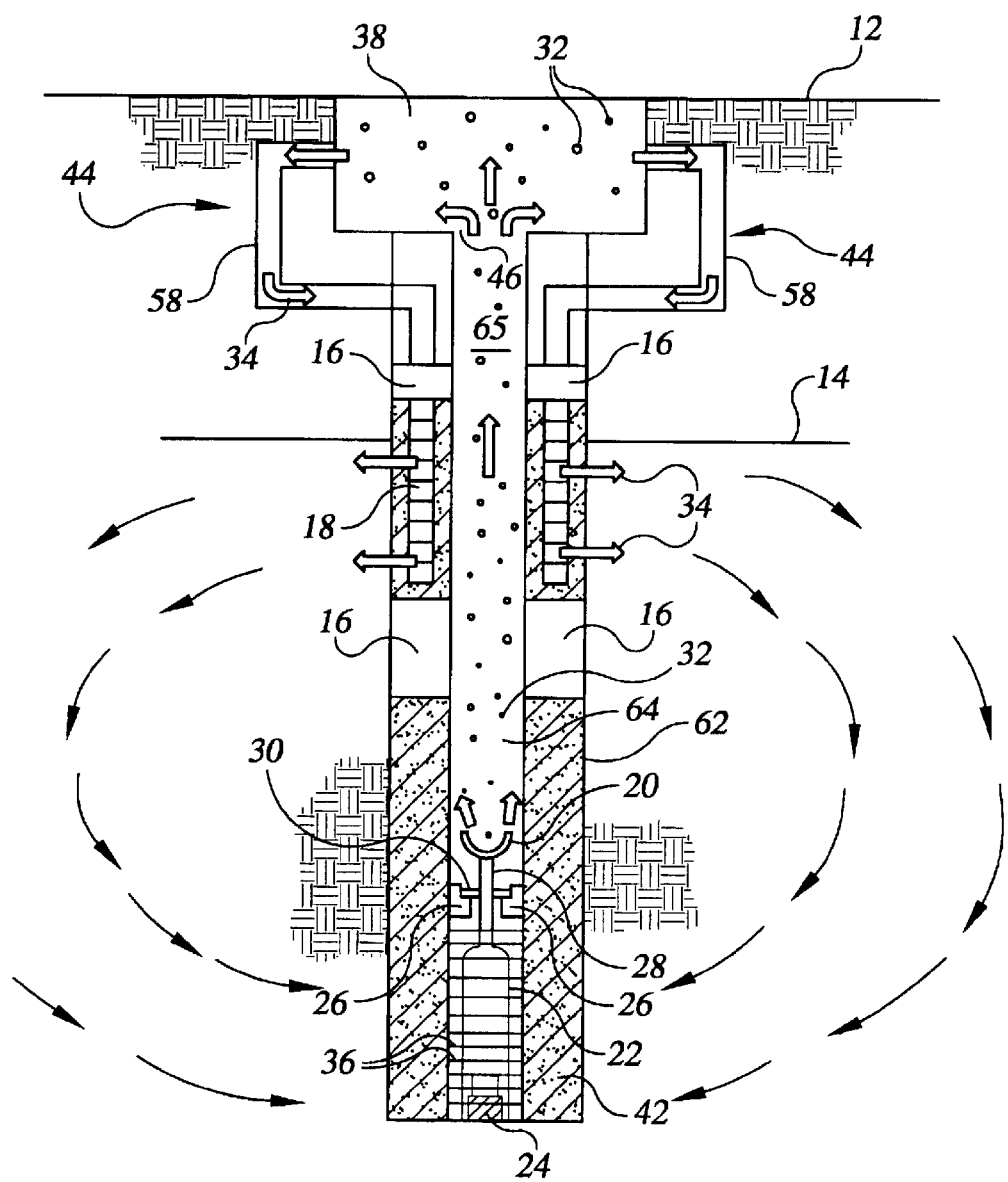
FIG. 1 is a front-sectional view representation of a soil and groundwater remediation system.

A front-sectional view of a preferred embodiment of the groundwater remediation system 10 is shown in FIG. 1. Groundwater enters a lower portion 64 of the reaction chamber 65 through an intake well screen or inlet 36. Once inside the lower reaction chamber 64, the water is directed to an upper portion 38 of the reaction chamber 65 by a pump 22. The upward velocity of the water suspends a reactive medium 32 to form a slurry. The reactive slurry 32 chemically reacts with the contaminants in the groundwater thereby eliminating or reducing their toxicity. It is noted that suspension of the reactive medium 32 provides greater overall reactive surface area. Because there is greater reactive surface area, and because the groundwater is actively pumped through the reaction chamber, remediation time is quicker.

To further aid with suspension of the reactive medium 32, the pump discharge 28 may be equipped with a slurry suspending nozzle 20. The nozzle 20 may be pivotally attached to the pump discharge 28 such that the nozzle rotates as it discharges the fluid into the lower reaction chamber 64.

Figure 3:
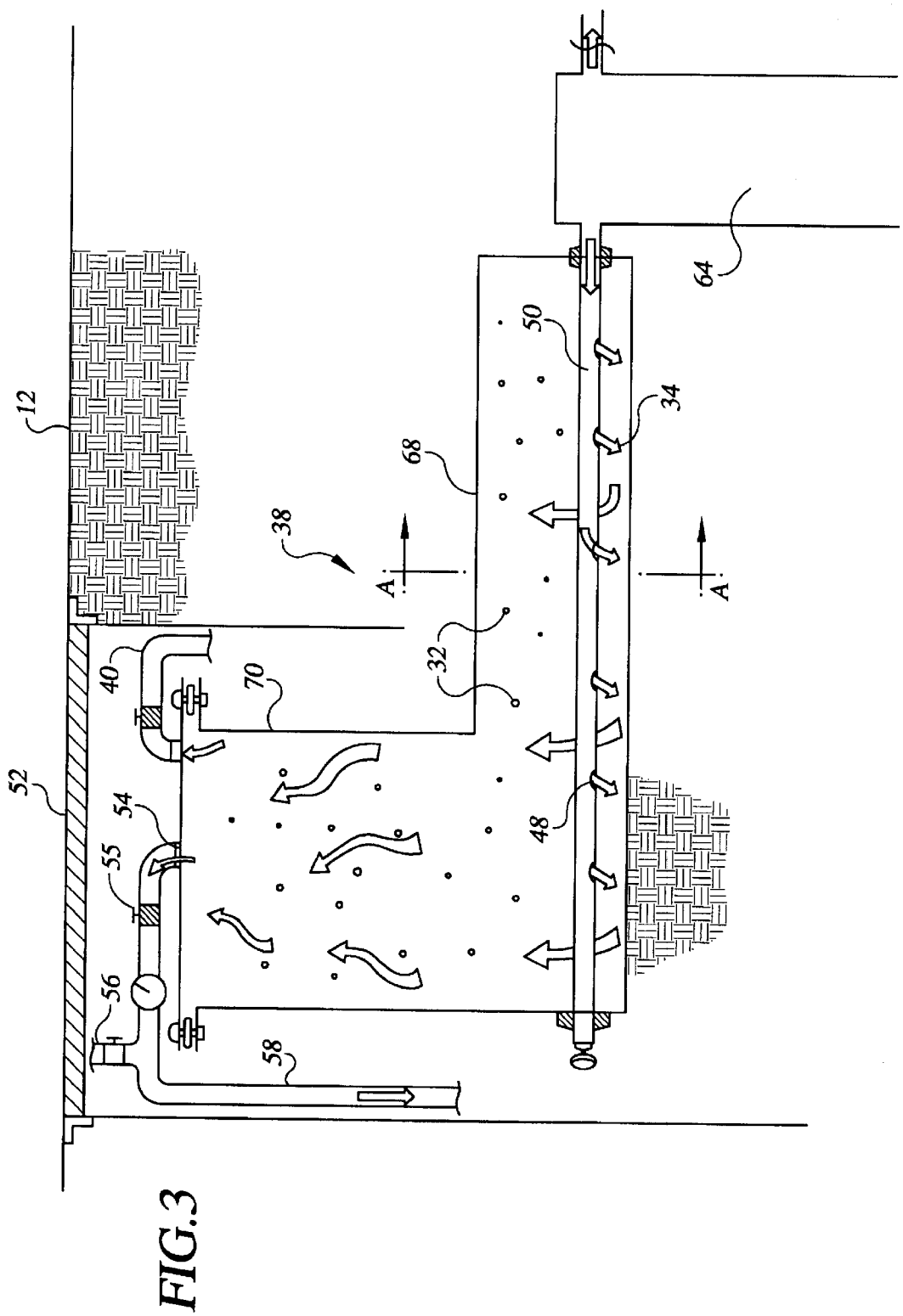
FIG. 3 is a side-sectional view of an upper reaction chamber.

The level of remediation may be tested through a sample port 56 (shown in FIG. 3). Treated water is returned to the subsurface through a discharge loop 44. The discharge loop 44 consists of an outlet pipe or tube 58 leading to an exit well screen 18. The direction of the water flow is indicated by the large arrows 34.

In this particular embodiment, the pump discharge 28 is circumscribed by a separation plate 30. The separation plate 30 is seated in a notched ring 26 on the inside surface of the lower reaction chamber 64. The separation plate 30 prevents the reactive medium from being drawn into the pump intake. Alternatively, an inflatable packer could be used instead of the separation plate 30. It is noted that the separation plate 30 may be equipped with a cord grip (not shown). The cord grip would allow a power supply cord (not shown) running from the pump motor 24 to be threaded through the ring plate 30 up through the reaction chambers to an outside power source.

Bentonite grout seals 16 are used in this particular embodiment to prevent fluids from circulating within the well bore annulus and to allow fluids to be returned to the subsurface under pressure. Numerous other types of seals could also be used that would provide other benefits apparent to one of skill in the art. It is also noted that specific portions of the bore hole 62 are packed with properly engineered sand 42.

Figure 2:
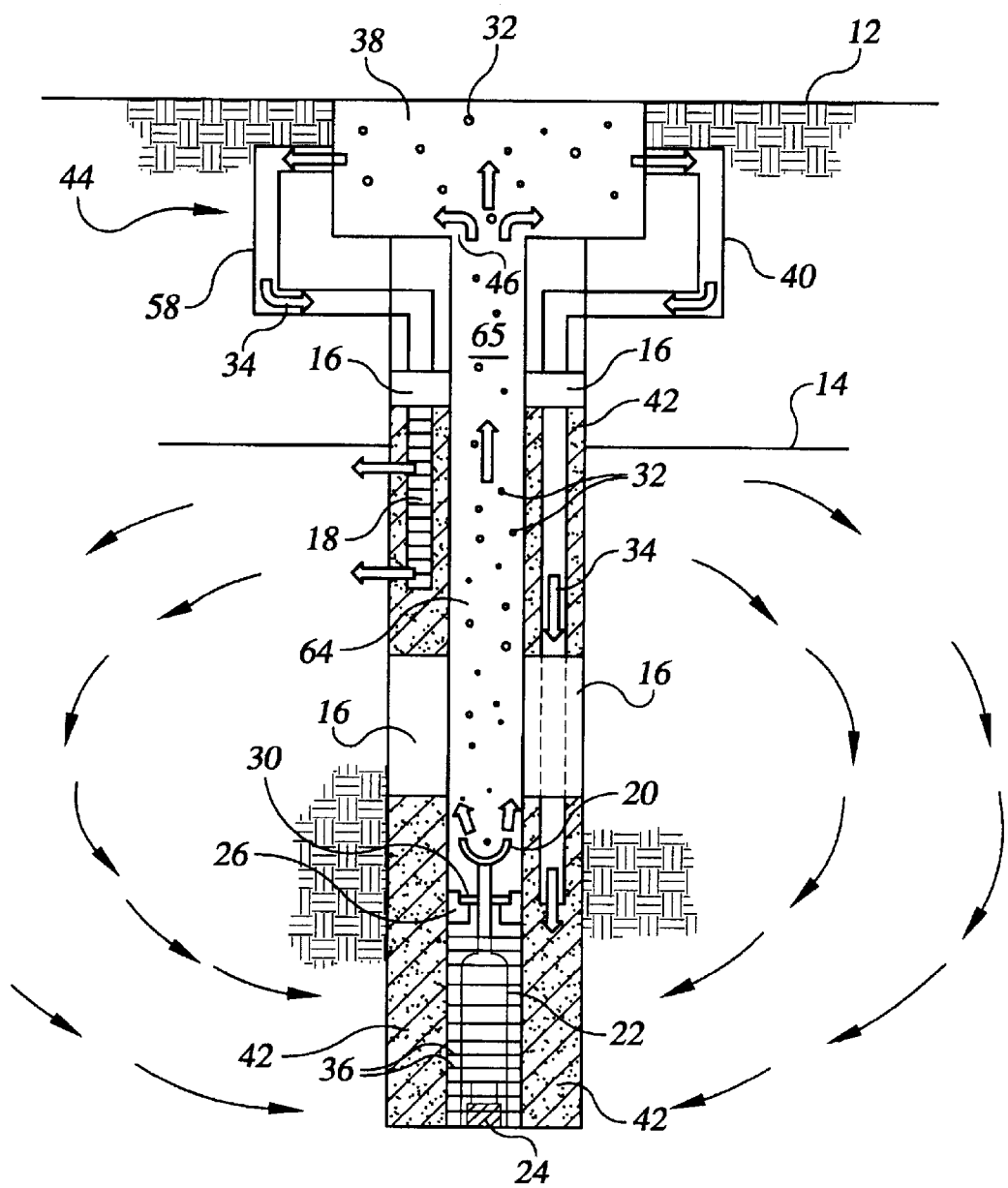
FIG. 2 is a side-sectional view representation of the soil and groundwater remediation system presented in FIG. 1.

FIG. 2 shows a side-sectional view of the preferred embodiment shown in FIG. 1. This figure demonstrates the recirculation features of the present invention. Recirculation of fluids through the reaction chamber 65 more than once is possible by redirecting portions of the fluids to a recirculation pipe 40. In this embodiment, the recirculation pipe 40 is attached at a point on the upper reaction chamber directs fluid downward to a point where the fluid is discharged to the lower sand pack 42. The pump 22 recaptures the fluid and returns it to the reaction chamber 65. A portion of the treatment water can be continuously recirculated to optimize both the reaction time and the suspension velocity.

It is noted that both the discharge loop 44 and the recirculation pipe 40 may be equipped with a particulate filter or sieve 54 (FIG. 3) that retains the reactive medium 32 before either discharging or recirculating the water. Various other methods of retaining the reactive slurry could be used that would be apparent to one skilled in the art.

Figure 4:
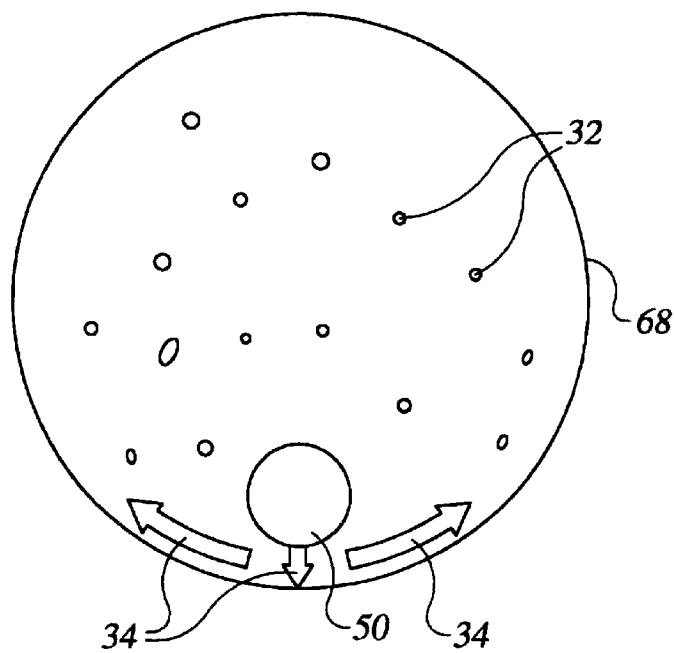
FIG. 4 is a cross-sectional view of the upper reaction chamber of FIG. 3 taken along line A—A.

FIGS. 3 and 4 illustrate an embodiment of the groundwater remediation system that utilizes an extension of the upper reaction chamber 38. Utilizing an extended upper reaction chamber allows the contaminated water to be better exposed to the reactive medium for a longer period of time. Specifically, the lower reaction chamber 64 connects to a pipe or conduit 50.

The conduit 50 runs through a horizontal extension 68 of the upper reaction chamber 38 and has a plurality of holes or openings 48 in the bottom of the conduit 50. As the water flows through the conduit 50, it is forced through the openings 48 thereby directing a downward stream of water (as shown by the arrows in FIGS. 3 and 4). This downward stream of water is deflected by the bottom of the upper reaction chamber 38 and thereby provides agitation that keeps the reactive medium 32 suspended. The water then passes through a particulate filter 54 into the outlet pipe 58 of the discharge loop 44. The water is then released from the system as discussed above.

It is noted that in FIG. 3, the pipe 50 is shown leading to one upper reaction chamber 38. However, as is indicated in the drawing, the pipe could connect to multiple chamber extensions simultaneously—each functioning in the manner outlined above. Additionally, FIGS. 1–3 show the upper reaction chamber 38 as being relatively short and below the ground surface 12. However, it is noted that the upper reaction chamber 38 could be any desired length or size and could be above or below the ground surface 12.

Other features shown in FIG. 3 include the vertical extension 70 of the upper reaction chamber 38. Additionally, manways 52 may provide access to a sample port 56, flow control valve 55, or to the reaction chamber 65.

Figure 5A:
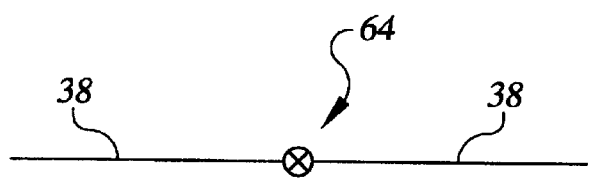
FIGS. 5a–5b illustrate examples of upper reaction chamber configurations.
Figure 5B:
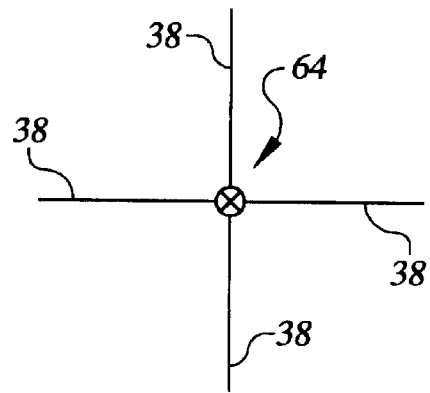

FIGS. 5a–5b show examples of the various configurations the upper reaction chamber 38 can take. Each of these embodiments would allow one skilled in the art to design for the required contact times. However, these figures are meant for illustration and in no way are meant to limit the possible number of configurations. FIG. 5a is a map view illustration of a T pattern, wherein the perpendicular orientation of the lower reaction chamber 64 relative to the upper reaction chamber 38 forms a "T" (with the lower reaction chamber 64 extending into the page). FIG. 5b illustrates a cross pattern of the upper reaction chambers 38. For each of these configurations, once the contaminated water has passed through the upper reaction chamber 38, portions of the water may then either be recirculated through the system, or discharged back to the subsurface as discussed above.

Figure 6:
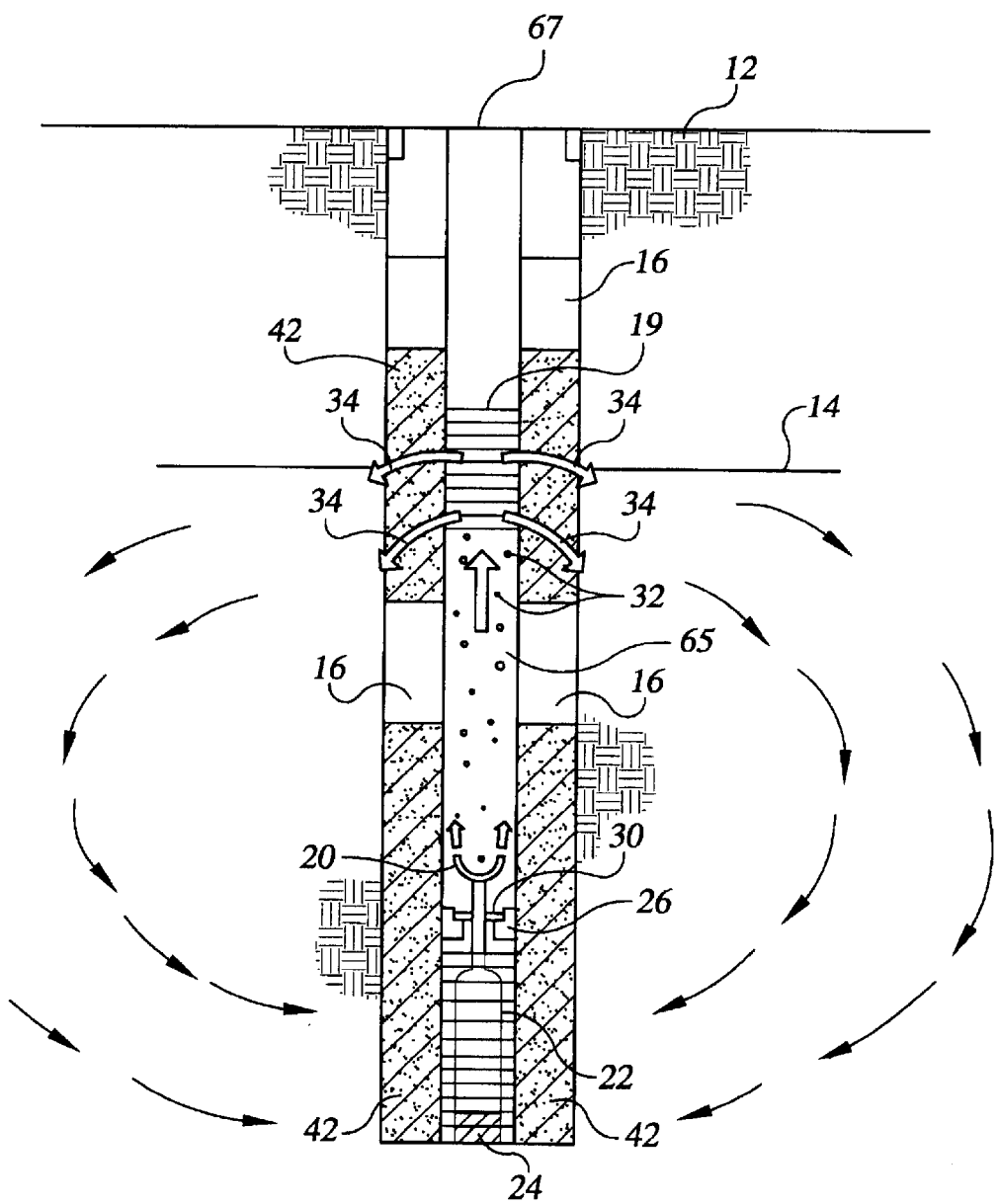
FIG. 6 is front view of another embodiment of a soil and groundwater remediation system.

FIG. 6 illustrates another embodiment of the present invention. In this embodiment, the treated water is discharged directly from the reaction chamber 65 through an outlet or exit well screen 19, rather than through a discharge loop 44. It is noted that the outlet 19 is positioned approximately at the groundwater interface 14. The top of the well is shown as being sealed with a well seal 67.

It is also noted that a variety of reactive components may be used with the present invention. Table 1 below outlines some examples of reactive components that may be used with the present invention. Table 2 outlines potential catalysts that may be used along with the reactive components. Table 3 outlines some examples of contaminants the present invention may be used to treat.

TABLE 1

| Potential Reactive Media |
| --- |
| Zero Valent Iron |
| Zero Valent Copper |
| Zero Valent Zinc |
| Zero Valent Palladium |
| Zero Valent Metal Mixtures |
| Calcite |
| Pyrite |
| Titanium Oxide |
| Manganese Oxides |
| Combinations of Titanium and Manganese Oxides |
| Zeolites |

TABLE 2

| Potential Catalysts |
| --- |
| Light Energy |
| Cathode/Anode/Electrical Circuit |
| Heat |

TABLE 3

| Potential Contaminants |
| --- |
| Chromium |
| Arsenic |
| Mercury |
| Cadmium |
| Uranium |
| Technetium |
| Nitrates |
| Sulfates |
| Chlorinated Methanes |
| Chlorinated Ethanes |
| Chlorinated Ethenes |
| Nitroaromatics |
| PCBs |
| Petroleum Products |
| Molybdenum |
| Copper |
| Silver |
| Mercury |
| Carbon Tetrachloride |
| Vinyl Chloride |
| Chloroform |
| Freon |

Numerous modifications and alternative arrangements may be devised by those skilled in the art without departing from the spirit and scope of the present invention and the appended claims are intended to cover such modifications and arrangements. For example, soil vapor extraction could be used in combination with this technology. Surfactants, sucrose, biological nutrients, redox reactants in solution, or cometabolic compounds could be circulated through an aquifer with the system described herein.

Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the principles and concepts set forth herein.

What is claimed is:

1. A liquid remediation system, comprising:

a) a reaction chamber, defined by a well casing, having an inlet in communication with a source of liquid;

b) a pump for directing the liquid through the reaction chamber;

c) a reactive medium, that chemically reacts with a contaminant, dispersed as a slurry throughout the reaction chamber; and d) at least one discharge loop for directing the liquid back to the source from the reaction chamber after the liquid has undergone a level of remediation.

2. The liquid remediation system of claim 1, wherein the reaction chamber further comprises an upper reaction chamber and a lower reaction chamber opening into the upper reaction chamber.

3. The liquid remediation system of claim 2 wherein the upper reaction chamber forms at least one horizontal extension that extends along a plane that is substantially perpendicular to the lower reaction chamber.

4. The liquid remediation system of claim 3, wherein the upper reaction chamber further comprises at least one vertical extension that is perpendicular to the horizontal extension and is in communication with the horizontal extension at an end of the horizontal extension opposite the lower reaction chamber opening.

5. The liquid remediation system of claim 2, wherein the upper reaction chamber further comprises:

a) a horizontal extension;

b) a conduit, being in communication with the lower reaction chamber and extending into the horizontal extension; and c) a plurality of openings in a bottom side of the conduit for initially directing the liquid in a downward direction inside the horizontal extension.

6. The liquid remediation system of claim 2, wherein the upper reaction chamber forms a cross configuration.

7. The liquid remediation system of claim 2, wherein the upper reaction chamber forms a T configuration.

8. The liquid remediation system of claim 2, wherein the upper reaction chamber forms a horizontal configuration.

9. The liquid remediation system of claim 2, wherein the pump includes a discharge portion that is equipped with a slurry suspending nozzle.

10. The liquid remediation system of claim 1, further comprising at least one recirculation pipe having one end in communication with the reaction chamber, and another end proximate to the inlet.

11. A method of remediating a liquid, comprising the steps of:

a) providing a reaction chamber, defined by a well casing, having an inlet in communication with a source of liquid;

b) directing the liquid through the reaction chamber by a pump;

c) chemically reacting a contaminant in the liquid with a reactive medium that is dispersed as a slurry throughout the reaction chamber; and d) directing the liquid back to the source from the reaction chamber through at least one discharge loop after the liquid has undergone a level of remediation.

12. The method of claim 11 wherein the reaction chamber further comprises an upper reaction chamber and a lower reaction chamber opening into the upper reaction chamber.

13. The remediation method of claim 12, wherein the upper reaction chamber forms a horizontal extension that is substantially perpendicular to the lower reaction chamber.

14. The remediation method of claim 12, wherein the upper reaction chamber further comprises a vertical extension in communication with the horizontal extension at an end of the horizontal extension that is opposite the lower reaction chamber opening.

15. The remediation method of claim 12, wherein the upper reaction chamber further comprises:

a) a horizontal extension;

b) a conduit, being in communication with the lower reaction chamber and extending into the horizontal extension; and c) a plurality of openings in a bottom side of the conduit for initially directing the liquid in a downward direction inside the horizontal extension.

16. The remediation method of claim 12, wherein the upper reaction chamber forms a cross configuration.

17. The remediation method of claim 12, wherein the upper reaction chamber forms a T configuration.

18. The remediation method of claim 12, wherein the upper reaction chamber forms a horizontal configuration.

19. The remediation method of claim 11, further comprising the step of recirculating the liquid through a recirculation pipe having one end in communication with the reaction chamber, and another end proximate to the inlet.

20. The remediation method of claim 11, wherein the pump includes a discharge portion that is equipped with a slurry suspending nozzle.

21. A liquid remediation system, comprising:

a) a reaction chamber, defined by a well casing, having an inlet in communication with a source of liquid;

b) a pumping means for directing the liquid through the reaction chamber;

c) a reactive medium, that chemically reacts with a contaminant, dispersed as a slurry throughout the reaction chamber; and d) at least one discharge outlet for allowing the liquid out of the system after the liquid has undergone a level of remediation.

* * * * *